United States Patent
Allen (10) Patent No.: US 6,200,397 B1
(45) Date of Patent: Mar. 13, 2001

(54) METHOD AND APPARATUS FOR STRIP ANODE WRAPPING FOR CATHODIC PROTECTION OF TUBULAR MEMBERS

(76) Inventor: John R. Allen, 10310 Hondo Hill, Houston, TX (US) 77064

( * ) Notice: Subject to any disclaimer, the term of this patent is extended or adjusted under 35 U.S.C. 154(b) by 0 days.

(21) Appl. No.: 09/436,309

(22) Filed: Nov. 8, 1999

(51) Int. Cl.[7] .................................................. C21D 9/08
(52) U.S. Cl. .................... 148/521; 148/516; 148/519; 148/527; 148/533; 156/443; 156/446; 156/447; 156/448; 156/449; 156/456; 156/458; 156/555; 242/434.1; 242/434.2; 242/434.9; 242/601; 242/610; 242/610.5; 242/615.21; 204/196.18; 204/196.21; 204/196.22; 204/196.25; 204/196.28; 204/196.38; 266/102; 266/103; 266/274; 266/275; 266/276
(58) Field of Search .................... 204/196.18, 196.21, 204/196.22, 196.25, 196.28, 196.38; 242/434.1, 434.2, 434.9, 601, 610, 610.5, 615.21, 147 R; 156/53, 56, 60, 84, 85, 160, 162, 166, 233, 272.2, 273, 311, 443, 446, 447, 448, 449, 456, 458, 555; 266/102, 103, 274, 275, 276

(56) References Cited

U.S. PATENT DOCUMENTS

| | | | |
|---|---|---|---|
| 2,070,925 | 2/1937 | Rolfs et al. | 242/11 |
| 2,359,751 | 10/1944 | Cummings et al. | 242/11 |
| 2,370,254 | 2/1945 | Mickelson | 242/11 |
| 2,471,580 | 5/1949 | Perrault et al. | 154/41 |
| 2,770,284 | 11/1956 | Myrick | 154/41 |
| 3,190,780 | 6/1965 | McNulty et al. | 156/162 |
| 3,990,478 | 11/1976 | McFarland | 138/103 |
| 4,069,088 | 1/1978 | Cottam | 156/392 |
| 4,383,631 * | 5/1983 | Fairchild | 242/151 |
| 4,426,834 | 1/1984 | Dokmo et al. | 57/10 |
| 4,439,633 * | 3/1984 | Grooten | 156/53 |
| 4,572,868 * | 2/1986 | Hosaka et al. | 428/328 |
| 4,576,654 * | 3/1986 | Eddens et al. | 148/512 |
| 4,610,403 | 9/1986 | Goekler et al. | 242/7.23 |
| 4,645,697 | 2/1987 | Torigoe | 428/43 |
| 4,888,215 * | 12/1989 | Yoshioka et al. | 428/632 |
| 4,888,218 * | 12/1989 | Suzuki et al. | 427/383.9 |
| 5,133,126 * | 7/1992 | Matsuoka | 29/890.053 |
| 5,943,772 * | 8/1999 | Guzowski et al. | 29/890.07 |
| 6,012,495 * | 8/2000 | Antonsen | 138/131 |
| 6,042,659 * | 3/2000 | Brown et al. | 148/521 |

OTHER PUBLICATIONS

Brochure, BWE Ltd., *The Automatic Choice*, 1998 No Month Available.

* cited by examiner

*Primary Examiner*—Bruce F. Bell
(74) *Attorney, Agent, or Firm*—Kenneth L. Nash (57) ABSTRACT

A novel method and apparatus to apply a corrosion protection in the form of a zinc (or other sacrificial anodic material) tape to a tubular member such as pipe or coiled tubing to used as an underground or underwater pipeline or flow line is disclosed. The zinc tape is applied with sufficient heat and pressure to form a metallurgical bond between the zinc tape and underlying metal pipe. This allows the zinc tape to act simultaneously as a continuous protective metal barrier to the normal scrapes and nicks the pipe experiences during installation and as a sacrificial anode. The novel apparatus preheats the zinc tape with a nozzle containing heated gas such as nitrogen as it approaches the pipe surface. At the point of contact with the pipe surface, the nozzle continues heating the tape and pipe surface while a plurality of pressure rollers exert sufficient force on the zinc tape to form a metallurgical bond between the zinc tape and the pipe surface. Thus, the zinc tape becomes bonded to the outer surface of the pipe and acts as both a protective barrier and sacrificial anode.

16 Claims, 7 Drawing Sheets

METHOD AND APPARATUS FOR STRIP ANODE WRAPPING FOR CATHODIC PROTECTION OF TUBULAR MEMBERS

BACKGROUND OF THE INVENTION

1. Field of the Invention

This invention relates to a novel method and apparatus for applying cathodic protection to tubular members such as pipelines and flow lines used in the oil and gas industry. The invention is particularly suited to pipelines and flow lines in offshore applications using coiled tubing as the cathodic protection can be applied as the coiled tubing is deployed from a lay vessel. These pipelines and flow lines are usually buried underground whether on land or on the ocean bottom in a trench and the trench filled in with soil. The pipelines and flow lines are then subject to corrosion because of the chemical reactions occurring between the soil constituent elements and the metal pipe.

In order to protect the metal pipeline or flow line from this sort of cathodic or galvanic cell corrosion, the pipelines and flow lines have traditionally been protected in one of several ways. The first method used is to protect or insulate the pipe from the surrounding soil. This is done by coating the exterior of the pipe to prevent any galvanic or corrosion reaction occurring. Typical methods for this type of protection have included fusion-bonded epoxy coatings, enamel coatings or tape coating. Fusion-bonded epoxy coatings are best suited to applications where the pipe can be coated at the mill due to the high temperatures required to apply the coating.

Conversely, enamel and tape coatings usually are applied as the pipeline or flow line is being laid. Enamel coatings such as coal tar enamel are heated and applied to the pipe's exterior and then the pipe is wrapped with fiberglass, felt and kraft paper to protect the coal tar enamel while it hardens. Tape coatings are usually applied in one continuous operation by a single machine with the pipe being cleaned, coated and wrapped with a tape such as polyethylene or polyvinyl in a spiral manner with overlapping segments. All three of these methods suffer from the fundamental problem of any damage to the coating during the pipe laying process leaves the underlying pipe exposed and extremely vulnerable to corrosion and therefore structurally weak spots can form leaving the pressure containing capacity of the pipeline or flow line compromised.

Another method used is to leave the pipeline or flow line uncoated and attach sacrificial anodes, usually of zinc, to the pipe at predetermined spacings. This method also can be used as an additional measure with the protective coating type methods described above. This method often is only partially successful as the sacrificial anodes are damaged during the laying process, particularly in offshore settings, thereby leaving the pipe essentially unprotected. Additionally, if the sacrificial anode is used with the protective coating methods, the sacrificial anodes are spaced further apart than if the pipe is uncoated. This leads to problems when the protective coating is damaged at a point distant from the sacrificial anodes. Corrosion can begin at the damaged point and can move along the pipe under the protective coating, undetectable by visual inspection.

The present invention minimizes these various shortcomings and hazards by providing a method and apparatus to apply a corrosion protection to pipelines and flow lines that are both a protective coating and a cathodic protection. Recent advances in continuous casting technology allow a tape of a sacrificial anodic material, such as zinc or aluminum, to be formed with the tape's width and thickness held to a close tolerance. Thus, the zinc tape can be manufactured with a thickness of 10 mils or a thickness of 100 mils. An appropriate thickness can then be chosen depending on the degree of protection required, i.e., the expected length of time the pipeline will be in service. This advance along with advances in metallurgical technology that allow a high degree of purity in the sacrificial anode material make the current invention feasible. The current invention also offers advantages in leak detection of the underlying tubular member. The prior methods have the problem of allowing corrosion to form under the protective coating, undetected. The current invention helps to eliminate this problem as its thin coating will not contain a leak and therefore it is easily detectable.

A final problem with current technology relates to the fact that more and more oil and gas exploration and discovery is being done in deeper offshore locations. This means the wells are in more remote locations which means the pipelines and flow lines connecting these wells to the current infrastructure must be longer. These longer pipelines and flow lines in deeper water require more anodes because the colder water at the deeper slows the reaction of the sacrificial anodes, i.e., reduces the cathodic "throwing power" of the sacrificial anode as it is referred in the industry. The current invention overcomes these problems by providing a metallurgically bonded continuous sacrificial anode material on the pipeline or flow line. An additional benefit of the current invention is the sacrificial anode material tape of the current invention is much more compact than the previously described coal tar enamel or epoxy coatings. The smaller diameter of the coated tubular member using the current invention means more pipeline or flow line can be carried on the lay barge.

2. Description of Related Art

A number of patents have been issued for various machines to coat and wrap pipe and thereby leave a protective barrier.

One such machine is shown in U.S. Pat. No. 2,070,925 to E. L. Rolfs et al. that wraps tape onto a previously asphalt coated pipe in an overlapping manner.

U.S. Pat. No. 2,770,284 to E. L. Myrick discloses another machine that applies a heated coating material, wraps the pipe with a paper or like material, and transports itself along the pipe.

Another machine that wraps a fiber glass, kraft paper or plastic film tape onto a previously applied enamel coating is disclosed in U.S. Pat. No. 3,190,780 to F. E. McNulty etal.

U.S. Pat. No. 3,990,478 to W. H. McFarland discloses wrapping a pipe with a high tensile strength steel strip that is coated with a less noble metal, particularly zinc. The steel strip wrapping is used to strengthen the pipe. The zinc coating of the strip is electrically connected to the pipe being protected to complete the galvanic protection. Additionally, an embodiment is shown in which an external DC power source is used to augment the zinc coated strip.

An adhesive backed tape with galvanic sacrificial anode metal foil pieces is disclosed in U.S. Pat. No. 4,645,697 to Y. Torigoe. The tape is a vinyl material such as polyethylene or polyvinyl chloride and is used to wrap the pipe with the anode metal foil pieces contacting the pipe surface.

SUMMARY OF THE INVENTION

The current invention uses a novel method and apparatus to apply a corrosion protection in the form of a zinc (or other sacrificial anodic material) tape to the pipe being coated with sufficient heat and pressure to form a metallurgical bond between the zinc tape and underlying metal pipe. This allows the zinc tape to act simultaneously as a protective metal barrier to the normal scrapes and nicks the pipe experiences during installation and as a sacrificial anode.

According to the present invention, the method of applying such a novel coating is shown. The pipe, whether in the form of individual pipe joints or a continuous roll of coiled tubing, is fed through a straightener if needed, cleaned and then coated. The coating process utilizes an apparatus for feeding the zinc tape at an appropriate lead angle to the surface of the pipe. The novel apparatus preheats the zinc tape with a nozzle containing heated gas such as nitrogen as it approaches the pipe surface. At the point of contact with the pipe surface, the nozzle continues heating the tape and pipe surface while a plurality of pressure rollers exert sufficient force on the zinc tape to form a metallurgical bond between the zinc tape and the pipe surface. Thus, the zinc tape becomes bonded to the outer surface of the pipe and acts as both a protective barrier and sacrificial anode.

A principal object of the present invention is to provide a method and apparatus for metallurgically bonding a continuous sacrificial anode material to a pipeline or flow line.

Another object of the present invention is to provide a method and apparatus for metallurgically bonding a sacrificial anode material to coiled tubing in a continuous operation.

A further object of the present invention is to provide a method and apparatus for metallurgically bonding a sacrificial anode material to a tubular material that compensates for dimensional variations in the tubular member such as ovality.

A still further object of the present invention is to provide a method and apparatus for metallurgically bonding a sacrificial anode material to a tubular material that requires no waiting period for curing after application.

Another object of the present invention is to provide a method and apparatus for metallurgically bonding a sacrificial anode material to a tubular material that is environmentally safer than current method and produces no scrap.

These with other objects and advantages of the present invention are pointed out with specificness in the claims annexed hereto and form a part of this disclosure. A full and complete understanding of the invention may be had by reference to the accompanying drawings and description of the preferred embodiments.

BRIEF DESCRIPTION OF THE DRAWINGS

These and other objects and advantages of the present invention are set forth below and further made clear by reference to the drawings, wherein.

DESCRIPTION OF THE PRESENTLY PREFERRED EMBODIMENTS

Figure 1:
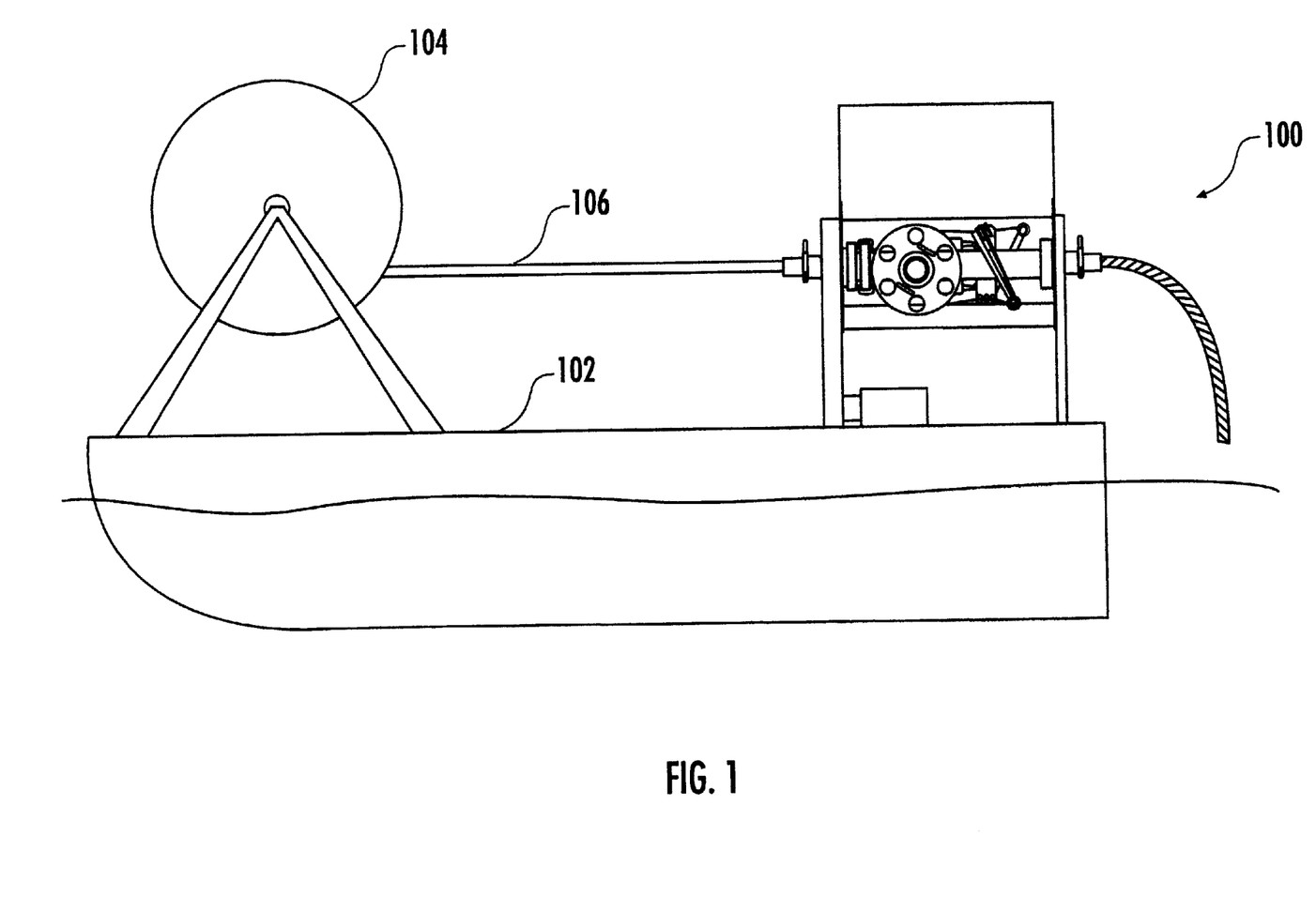
FIG. 1 is an elevation view of a lay barge with a spool of coiled tubing feeding the apparatus of the current invention for metallurgically bonding a sacrificial anode material to the coiled tubing.

With reference to the drawings, and particularly to FIG. 1, the wrapping and bonding machine 100 of the current invention is shown mounted on lay barge 102. Coiled tubing roll 104 is also mounted on the lay barge 102 and feeds coil tubing 106 to wrapping and bonding machine 100. After the sacrificial anode material is wrapped and bonded to the coil tubing 106, it is deployed to the ocean floor by means well known to those of ordinary skill in the art.

Figure 2:
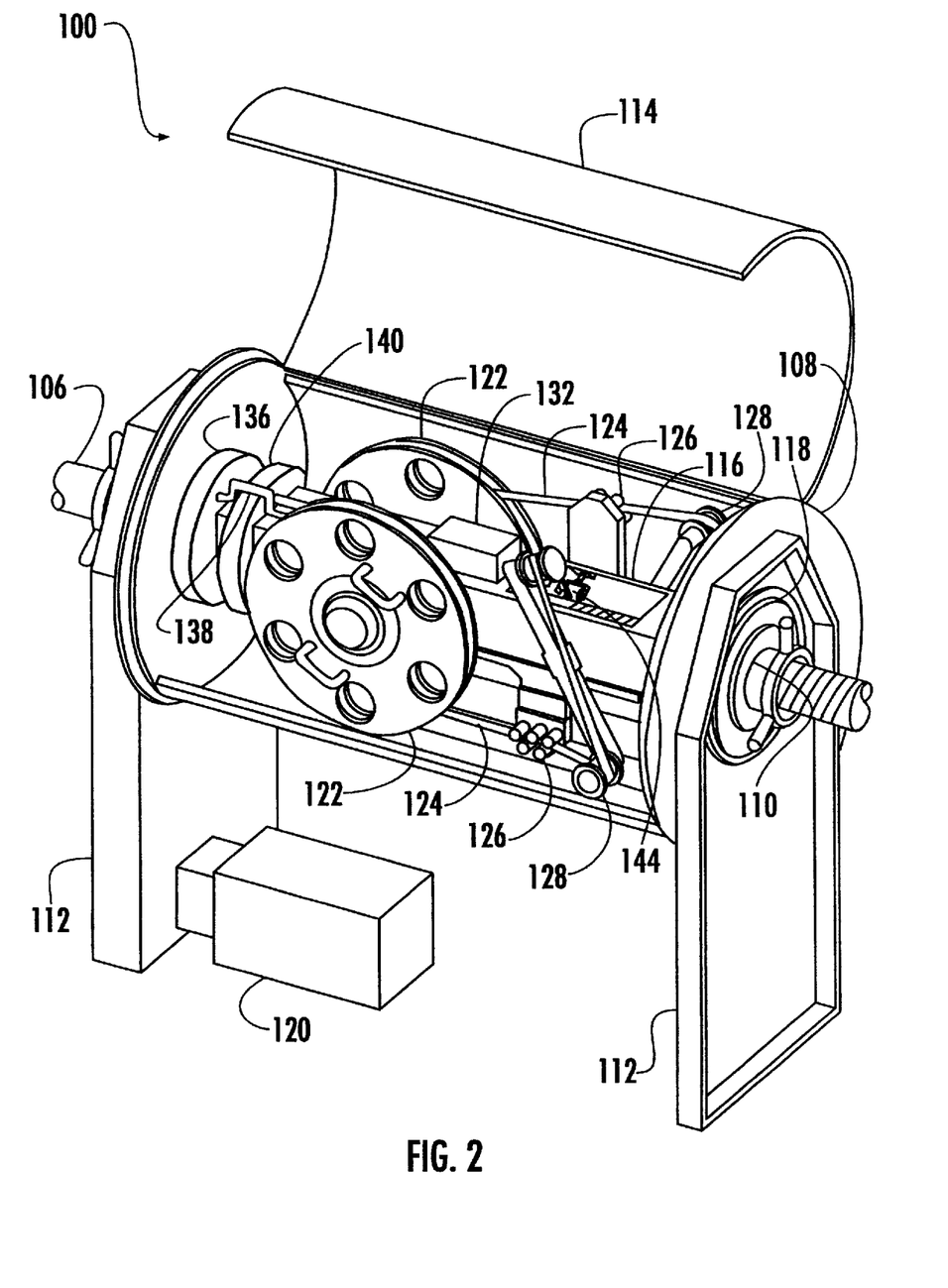
FIG. 2 is a perspective view of the apparatus of the invention for metallurgically bonding a sacrificial anode material to the coiled tubing.
Figure 3:
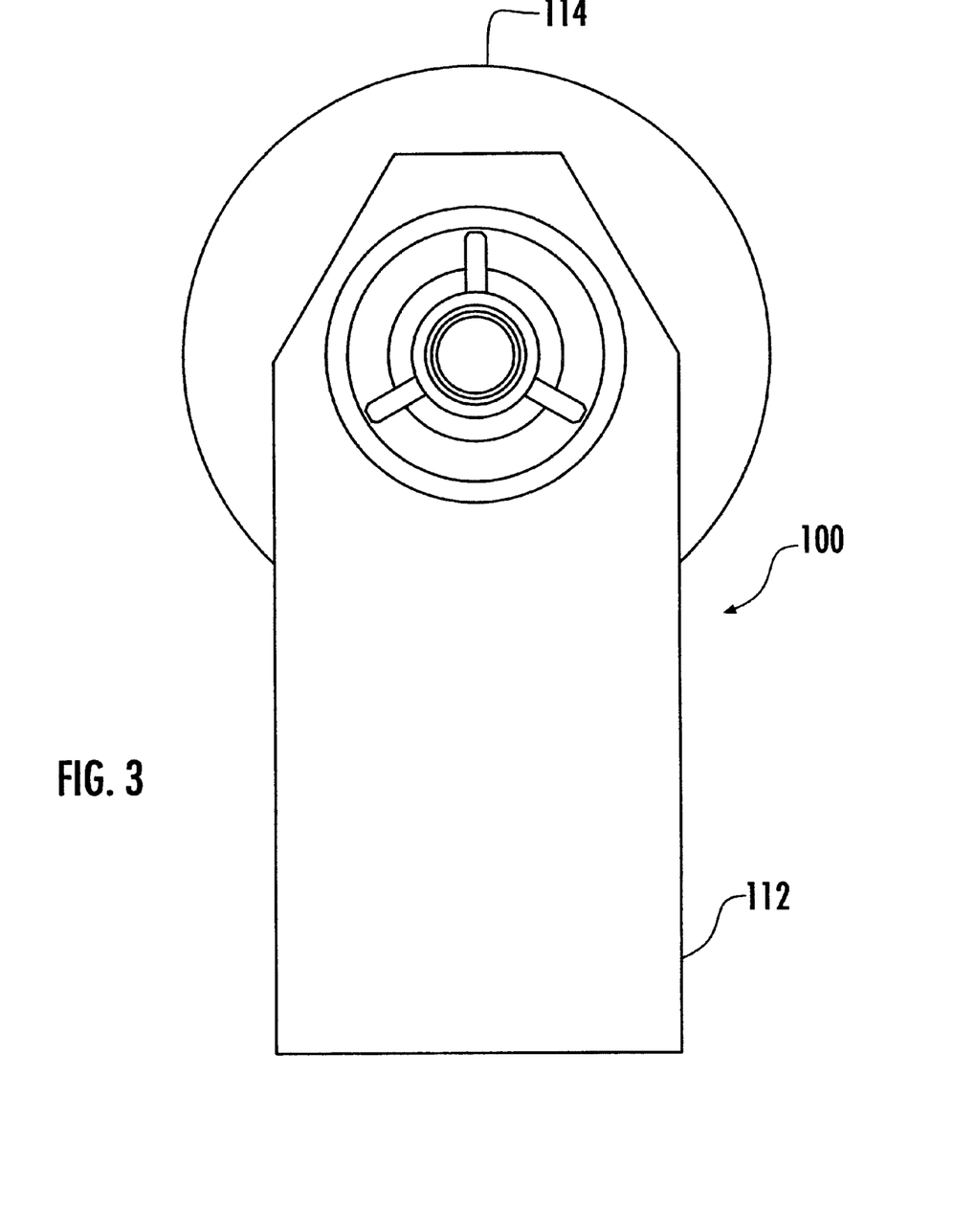
FIG. 3 is an end view of the apparatus of the invention for metallurgically bonding a sacrificial anode material to the coiled tubing.

As best seen in FIG. 2, wrapping and bonding machine 100 is shown in perspective view. Wrapping and bonding machine 100 includes outer frame 108 that is adapted to receive a tubular member such as coil tubing 106 with openings 110 at either end. Outer frame 108 is held at a convenient working height by end pedestals 112. Outer frame 108 has protective cover 114 pivotally mounted thereon to shield operators or wrapping and bonding machine 100 during operation. Rotatable housing 116 is mounted within outer frame 108 on support bearings 118 in end pedestals 112. Motor housing 120 is mounted on end pedestal 112 and supplies rotational torque to rotatable housing 116 by suitable driving means (not shown) such as drive belts or gear drives, well known to those of ordinary skill in the art. FIG. 3 shows an end view of wrapping and bonding machine 100 with protective cover 114 closed.

Figure 4:
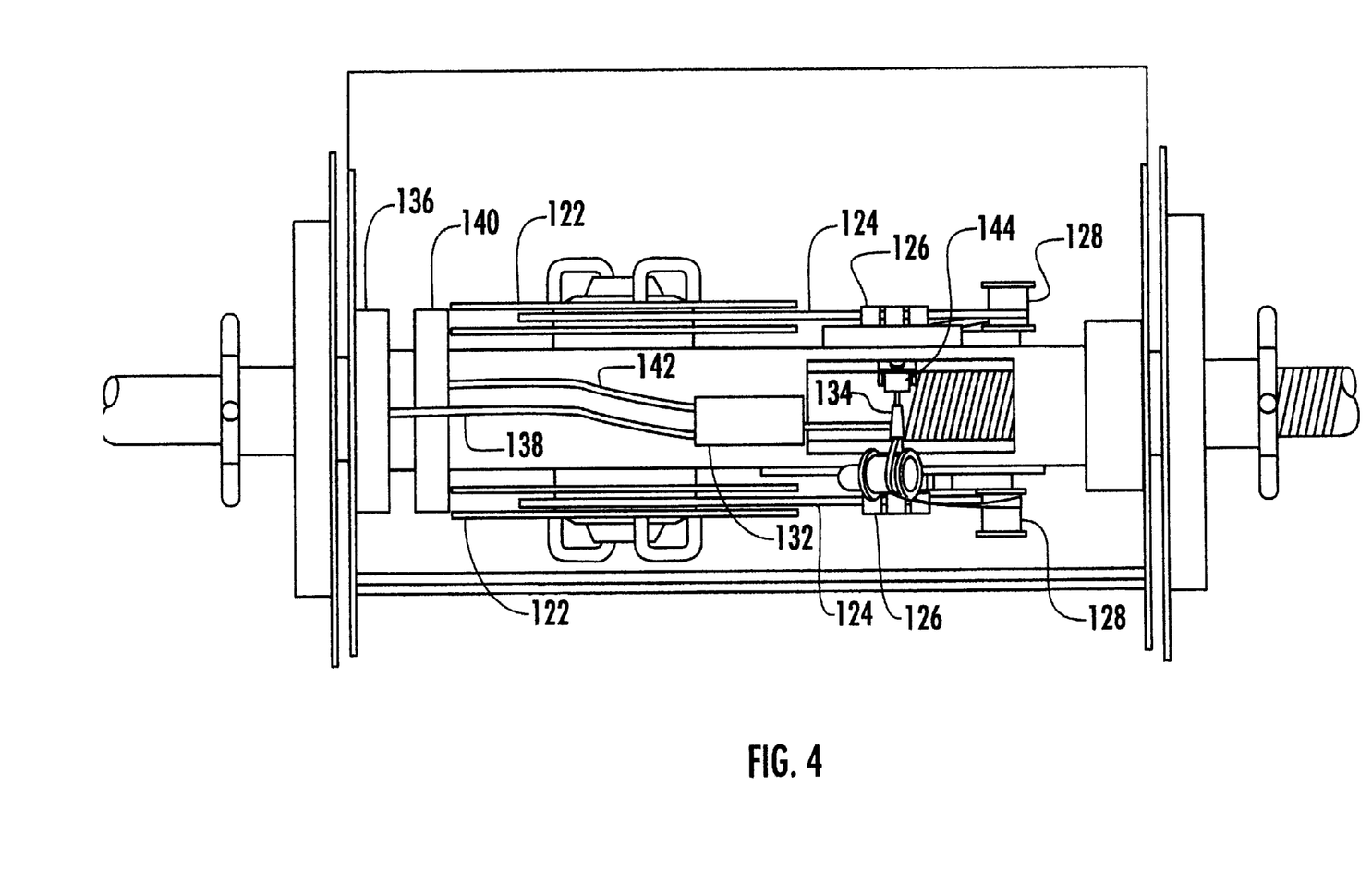
FIG. 4 is a top view of the apparatus of the invention for metallurgically bonding a sacrificial anode material to the coiled tubing.
Figure 5:
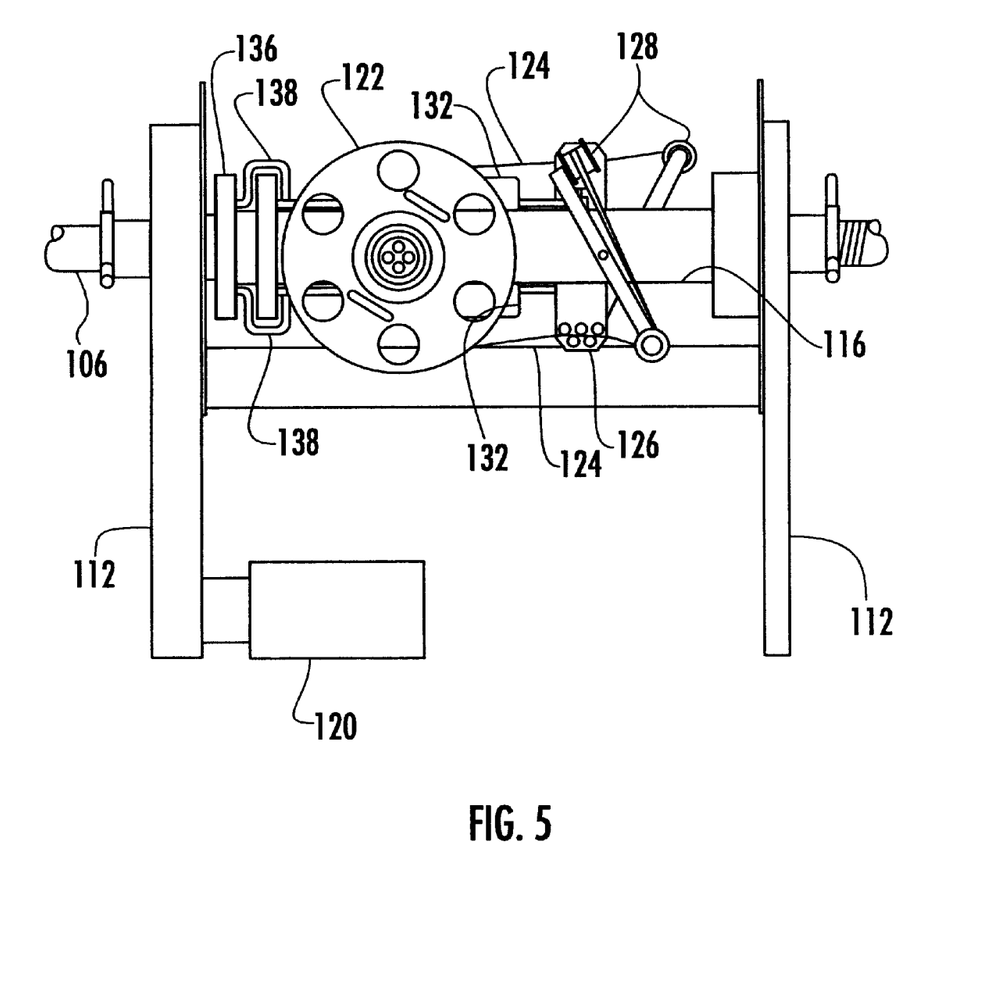
FIG. 5 is a side view of the apparatus of the invention for metallurgically bonding a sacrificial anode material to the coiled tubing.

With reference to FIGS. 2, 4 and 5, a means for supplying cathodic protection material, such as, supply reels 122, carries cathodic protection material, such as zinc tape 124. Supply reels 122 are mounted on rotatable housing 116 for purposes to be explained hereinafter. Zinc tape 124 is fed through a tensioning means, such as tensioning rollers 126 to ensure proper tensioning of zinc tape 124 as it is bonded to coil tubing 106. Zinc tape 124 is next fed through lead angle rollers 128, well known to those of ordinary skill in the art, that allow varying the angle at which zinc tape 124 is applied to coil tubing 106. Prior to being applied to coil tubing 106, zinc tape 124 is heated by suitable heating means, such as an inert gas like nitrogen gas 130, that is heated by flowing through heater box 132 and nozzle 134. Nitrogen gas 130 is supplied through rotating union 136 and supply pipe 138. Electrical swivel 140 supplies power through electrical conduit 142 to heater box 132 which heats nitrogen gas 130. As zinc tape 124 is heated and wrapped onto coil tubing 106, a means for applying pressure to zinc tape 124, such as pressure rollers 144, ensures a complete metallurgical bond between zinc tape 124 and coil tubing 106. Although zinc tape 124 and coiled tubing 106 have been shown as being heated by heated inert gas such as nitrogen gas 130, the current invention envisions and encompasses the use of equivalent heating methods such as direct flame, induction, or radiation of zinc tape 124 and coil tubing 106 either together or separately.

Figure 6:
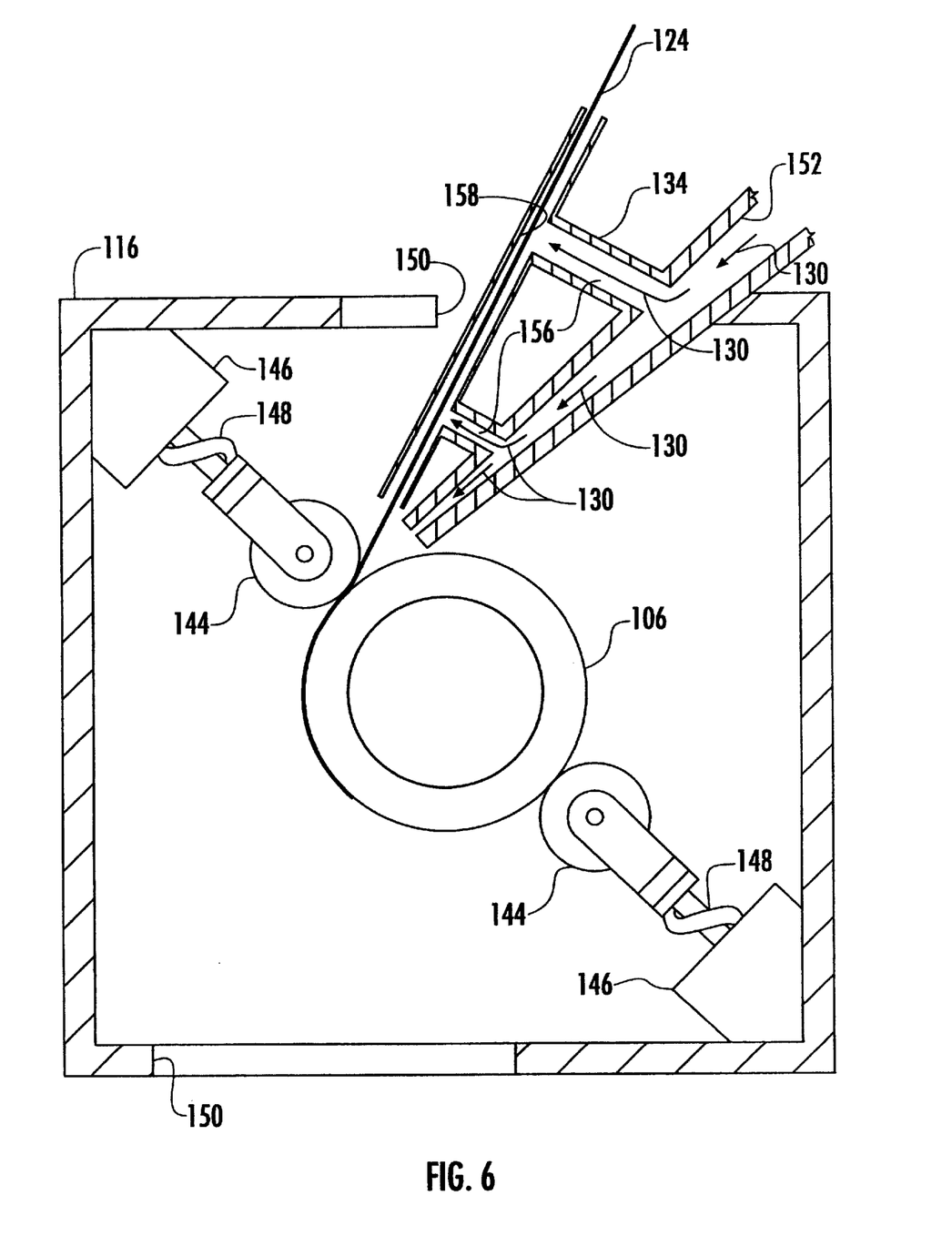
FIG. 6 is a detail view showing the sacrificial anode material being heated and pressure bonded to the coil tubing.

The details of the bonding process are best seen in FIG. 6. Pressure rollers 144 are mounted on roller blocks 146 with a suitable urging means, such as coil spring 148, positioned there between. Other suitable urging means could include a hydraulically powered piston. Roller blocks 146 are mounted with rotatable housing 116 and positioned to exert pressure on zinc tape 124 at the point of contact with coil tubing 106. Transverse openings 150 in rotatable housing 116 allow nozzles 134 to be positioned adjacent coil tubing 106 for heating zinc tape 124 as it is wrapped and bonded to coil tubing 106. Although only one nozzle 134 is shown in FIG. 6, it is well understood by those of ordinary skill in the art, that a second nozzle could be positioned to heat a second zinc tape 124 if a double wrap was desired. Nozzle 134 is of a two-chamber design. Heated nitrogen gas 130 is supplied from heater box 132 and introduced under pressure into primary heating chamber 152. Heated nitrogen gas 130 flows along primary heating chamber 152 exiting through orifice 154 at the point of contact of zinc tape 124 with pressure roller 144 and coil tubing 106. Simultaneously, heated nitrogen gas 130 flows through transverse passages 156 to preheating chamber 158 to preheat zinc tape as it passes through preheat chamber 158.

A typical sequence of steps for practicing the current invention utilizing the above described apparatus would be as follows. A tubular member such as coil tubing 106 is introduced into wrapping and bonding machine 100 through opening 110. Additional cleaning steps such as blasting or brushing, well known to those of ordinary skill in the art, may be applied to coil tubing 106 before introducing coil tubing 106 into opening 110. Zinc tape 124 (or other suitable sacrificial anode material) is initially attached to coil tubing 106 by suitable means. Power is supplied to motor housing 120 which in turn begins rotatable housing 116 turning and thereby causing zinc tape 124 to be wound onto coil tubing 106 as rotatable housing 116 turn. Zinc tape is fed from supply reels 122 through tensioning rollers 126 and over lead angle rollers 128 as previously described. Lead angle rollers 128 are well known to those of ordinary skill in the art and adjustable to vary the lead angle at which zinc tape 124 is wound onto coil tubing 106. This lead angle can be adjusted to a shallow angle to give an overlapping of adjacent wraps of zinc tape 124 and thereby give a continuous sheath on the coil tubing 106. Similarly, roller lead angles can be set at a steeper angle so adjacent wraps do not overlap thereby giving a "barber pole" wrap. This type of wrapping is advantageous when it is determined less cathodic protection is required. Zinc tape 124 feeds through nozzle 134 and is preheated and then heated additionally at the point of application as pressure roller 144 applies pressure. Testing has shown that such a method and apparatus allows zinc tape 124 to obtain a metallurgical bond with coil tubing 106. Although zinc tape 124 has been shown as being applied in a spiral wrap at a set lead angle, the current invention envisions and encompasses the wrapping could be done in other directions such as radially and axially. Similarly, although the sacrificial anodic material has been shown as a tape, it could also be in the form of a wire wound at the appropriate lead angle to give the desired degree of protection.

Figure 7A:
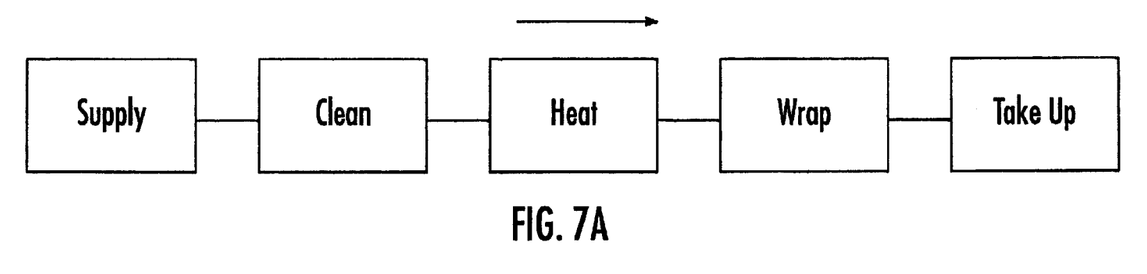
FIGS. 7A–7C are flow diagrams showing different sequences for practicing the method of metallurgically bonding a sacrificial anode material to coiled tubing of the present invention.
Figure 7B:
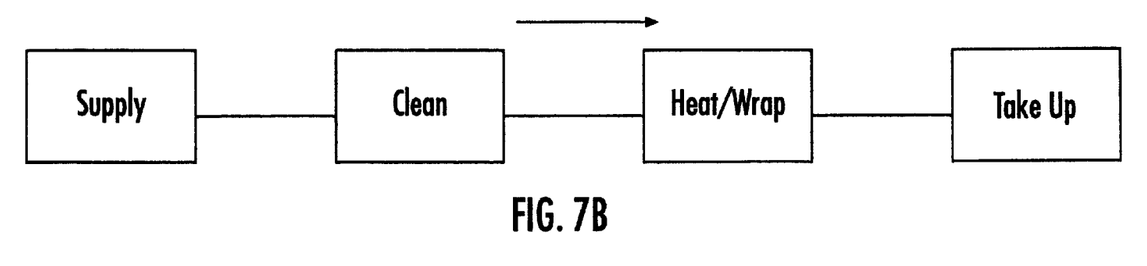
Figure 7C:
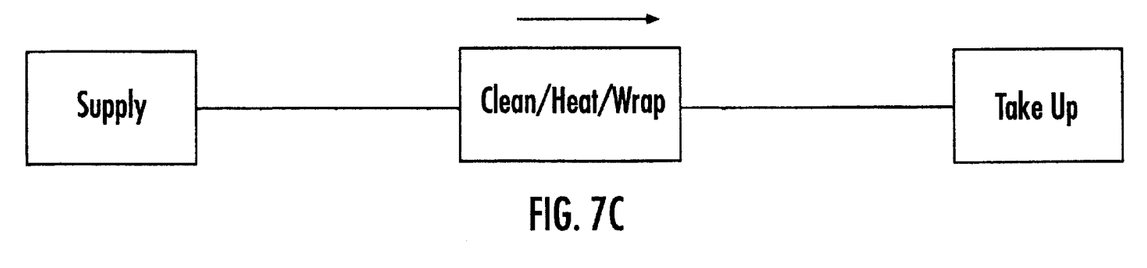

Although the presently preferred embodiment of the method and apparatus of the current invention envisions the cathodic protection material to be applied in an essentially single step process of cleaning the pipe, heating the cathodic protection material and wrapping it onto the pipe other embodiments are within the scope of the current invention. Referring to FIGS. 7A–7C, flow diagrams of other methods which break the aforementioned process into more discrete steps are shown. FIG. 7A shows the cleaning, heating and wrapping steps separated into different steps. This method would be most appropriate where the tubular member where individual joints of pipe and they were being coated on shore. FIG. 76 shows the cleaning step separated from the heating and wrapping steps. This method would be most useful where the pipe or coiled tubing needed extra precleaning before coating. FIG. 7C shows the cleaning, heating and wrapping steps combined into one operation as in the preferred embodiment.

My improved method and apparatus to apply a corrosion protection to pipelines and flow lines that is both a protective coating and a cathodic protection will be readily understood from the foregoing description. Furthermore, while the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the appended claims.

What is claimed is:

1. An apparatus for applying cathodic protection to tubular members, comprising:

an outer frame adapted to receive a tubular member;

a rotatable housing mounted within said outerframe surrounding said tubular member;

a means for supplying cathodic protection material;

a means for tensioning said cathodic protection material prior to applying said cathodic protection material to said tubular member;

a means for heating said cathodic protection material prior to applying said cathodic protection material to said tubular member; and, a means for applying pressure to said cathodic protection material as it is applied to said tubular member.

2. An apparatus for applying cathodic protection to tubular members according to claim 1 wherein:

said means for supplying cathodic protection material includes at least one supply reel.

3. An apparatus for applying cathodic protection to tubular members according to claim 2 wherein:

said means for tensioning said cathodic protection material prior to applying said cathodic protection material to said tubular member includes a plurality of tensioning rollers.

4. An apparatus for applying cathodic protection to tubular members according to claim 3 including:

at least one lead angle roller; and, said lead angle roller allowing a user to select a lead angle for applying said cathodic protection material within a predetermined range of lead angle.

5. An apparatus for applying cathodic protection to tubular members according to claim 4 wherein:

said means for heating said cathodic protection material prior to applying said cathodic protection material to said tubular member allows preheating of said cathodic protection material before application and heating of said cathodic protection material and said tubular member at the point of application of said cathodic protection material to said tubular member.

6. An apparatus for applying cathodic protection to tubular members according to claim 5 wherein:

said means for heating said cathodic protection material prior to applying said cathodic protection material includes a heater box, a multiple port nozzle and an inert gas supply;

said heater box heating said inert gas prior to said inert gas flowing through said multiple port nozzle; and, said multiple port nozzle positioned to preheat said cathodic protection material before application and heat said cathodic protection material and said tubular member at the point of application of said cathodic protection material to said tubular member.

7. An apparatus for applying cathodic protection to tubular members according to claim 6 wherein:

said means for applying pressure to said cathodic protection material as it is applied to said tubular member includes a pressure roller assembly.

8. An apparatus for applying cathodic protection to tubular members according to claim 7 wherein:

said pressure roller assembly includes an urging means to maintain sufficient pressure on said cathodic protection material as it is applied to said tubular member in combination with said heating of said cathodic protection material to produce a metallurgical bond between said cathodic protection material and said tubular member.

9. An apparatus for applying cathodic protection to tubular members according to claim 8 wherein:

said urging means is a coil spring.

10. An apparatus for applying cathodic protection to tubular members according to claim 9 wherein:

said cathodic protection material is a zinc tape.

11. An apparatus for applying cathodic protection to tubular members according to claim 10 wherein:

said tubular member is a roll of coiled tubing.

12. A method for applying cathodic protection to tubular members, comprising the steps of:

supplying a tubular member to which a cathodic protection material is to be applied;

cleaning said tubular member prior to applying said cathodic protection material;

supplying a cathodic protection material at a desired lead angle to said tubular member;

heating said cathodic protection material and said tubular member at the point of application of said cathodic protection material to said tubular member; and, applying sufficient pressure to said cathodic protection material at the point of application of said cathodic protection material to said tubular member to produce a metallurgical bond between said cathodic protection material and said tubular member.

13. A method for applying cathodic protection to tubular members according to claim 12, further comprising the steps of:

preheating said cathodic protection material.

14. A method for applying cathodic protection to tubular members according to claim 13, further comprising the steps of:

coiling said tubular member onto a take up reel after metallurgically bonding said cathodic protection material to said tubular member.

15. A method for metallurgically bonding a cathodic protection material to tubular members utilizing an apparatus for applying cathodic protection to tubular members wherein said apparatus includes an outer frame adapted to receive a tubular member and a rotatable housing mounted within said outer frame surrounding said tubular member, comprising the steps of:

cleaning a tubular member prior to metallurgically bonding a cathodic protection material to a tubular member;

supplying said cleaned tubular member to an apparatus for applying cathodic protection to tubular members wherein a cathodic protection material is to be applied;

supplying a cathodic protection material at a desired lead angle to said tubular member utilizing a supply reel, tensioning roller and lead angle roller positioned on said apparatus for applying cathodic protection to tubular members;

heating said cathodic protection material and said tubular member at the point of application of said cathodic protection material to said tubular member utilizing a means for heating positioned on said apparatus for applying cathodic protection to tubular members wherein said heating means allows preheating of said cathodic protection material before application and heating of said cathodic protection material and said tubular member at the point of application of said cathodic protection material to said tubular member; and, applying sufficient pressure to said cathodic protection material at the point of application of said cathodic protection material to said tubular member utilizing a means for applying pressure to said cathodic protection material positioned on said apparatus for applying cathodic protection to tubular members to produce a metallurgical bond between said cathodic protection material and said tubular member.

16. A method for metallurgically bonding a cathodic protection material to tubular members utilizing an apparatus for applying cathodic protection to tubular members wherein said apparatus includes an outer frame adapted to receive a tubular member and a rotatable housing mounted within said outer frame surrounding said tubular member according to claim 15, further comprising the steps of:

coiling said tubular member onto a take up reel after metallurgically bonding said cathodic protection material to said tubular member.

\* \* \* \* \*